Figure 13:
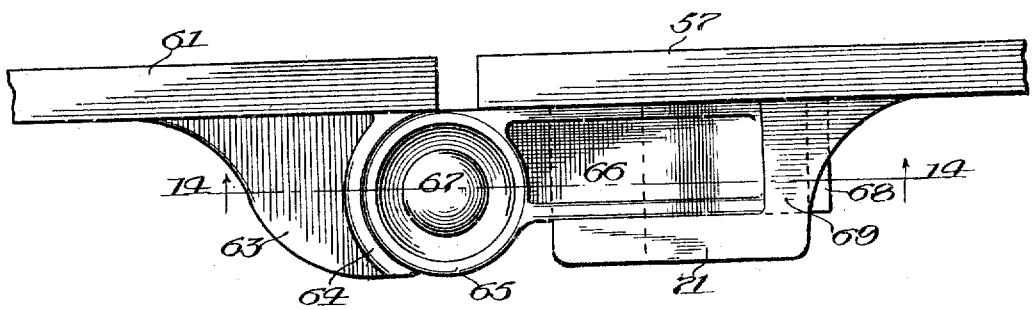

J. C. FITZGERALD.
ELEVATED TRACK FOR CARRIERS.
APPLICATION FILED JUNE 17, 1909.
954,275.
Patented Apr. 5, 1910.
6 SHEETS—SHEET 1.
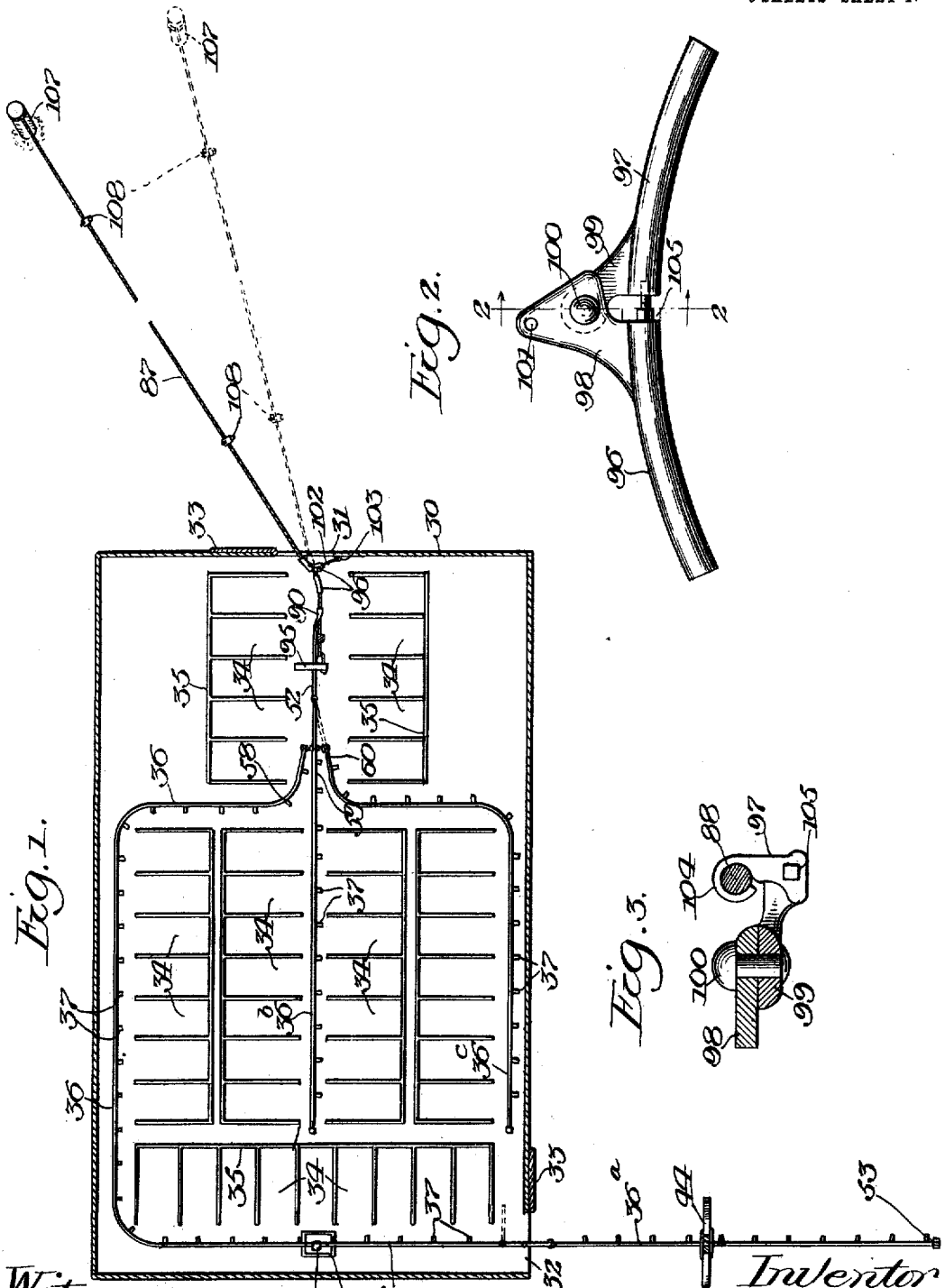

J. C. FITZGERALD.
ELEVATED TRACK FOR CARRIERS.
APPLICATION FILED JUNE 17, 1909.
954,275.
Patented Apr. 5, 1910.
6 SHEETS—SHEET 2.
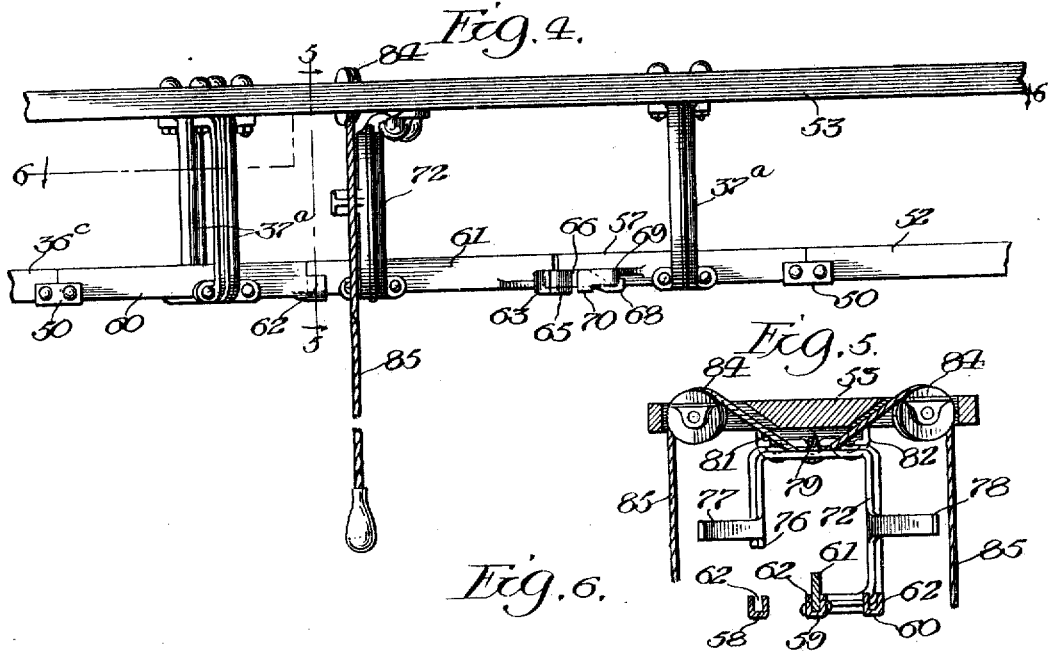
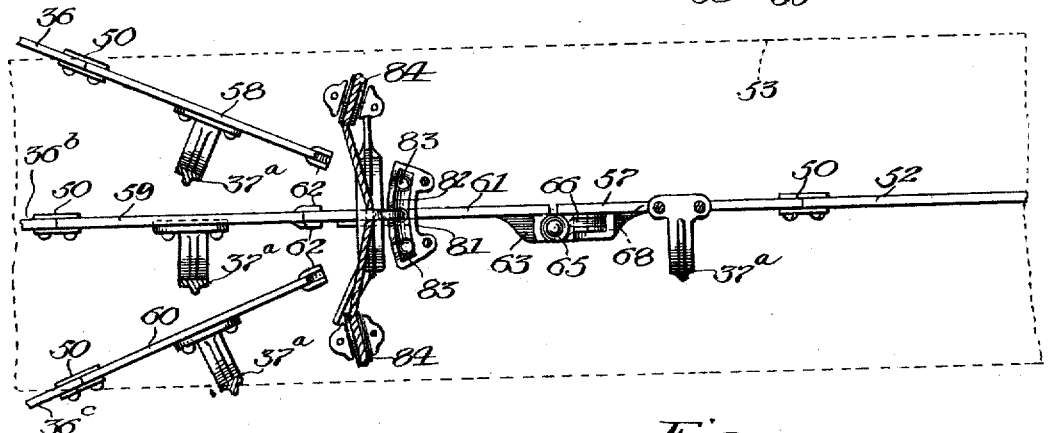
Witnesses
Inventor
Jeremiah C. Fitzgerald
by Chas. C. Tillman Atty J. C. FITZGERALD.
ELEVATED TRACK FOR CARRIERS.
APPLICATION FILED JUNE 17, 1909.
954,275.
Patented Apr. 5, 1910.
6 SHEETS—SHEET 3.
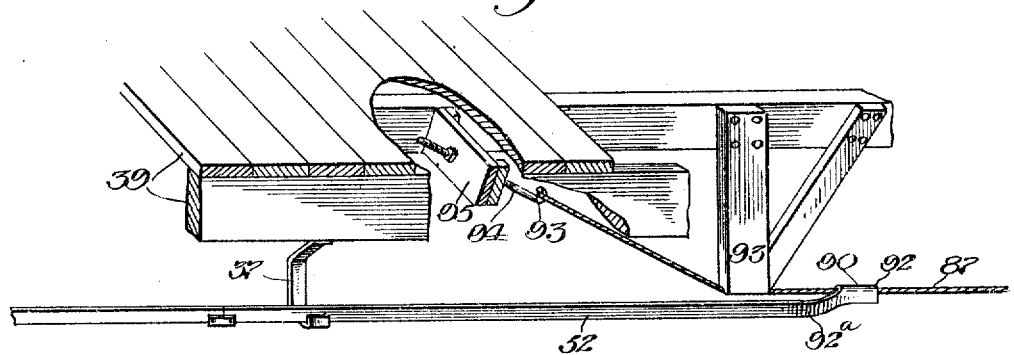
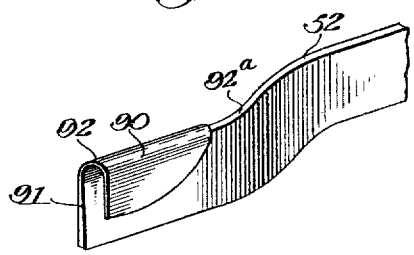
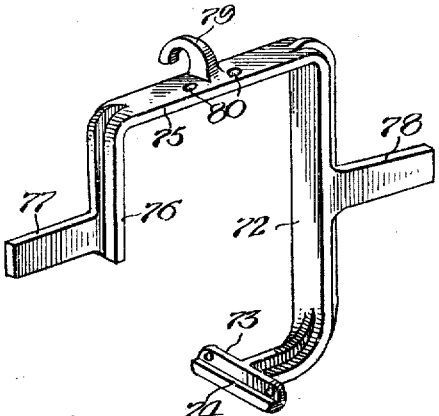
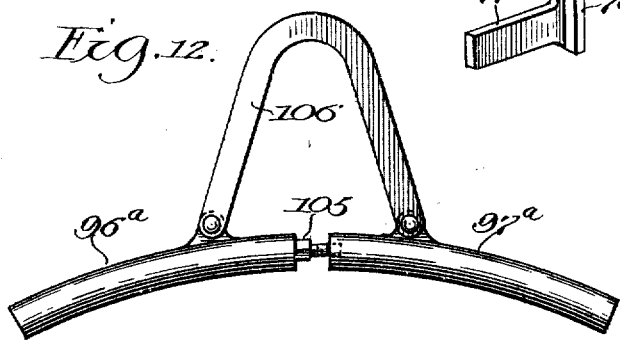
Witnesses
O. M. Ummich
J. E. Hanson
Inventor
Jeremiah C. Fitzgerald
by Chas. C. Tillman Atty

J. C. FITZGERALD.
ELEVATED TRACK FOR CARRIERS.
APPLICATION FILED JUNE 17, 1909.

954,275.

Patented Apr. 5, 1910.
6 SHEETS—SHEET 4.

Witnesses

Inventor
Jeremiah C. Fitzgerald
by Chas. A. Tillman atty

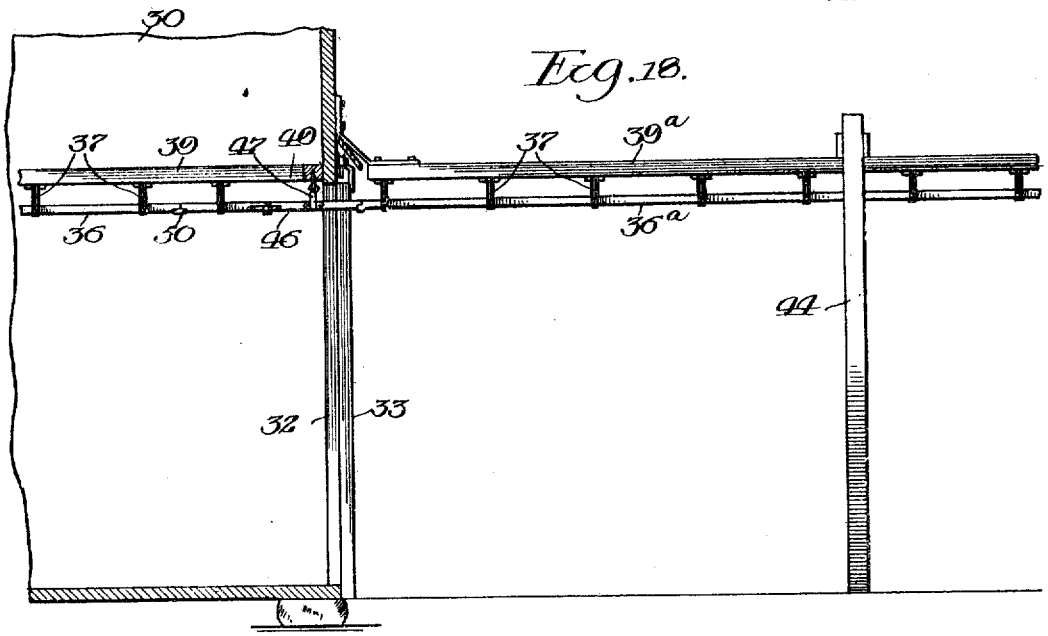
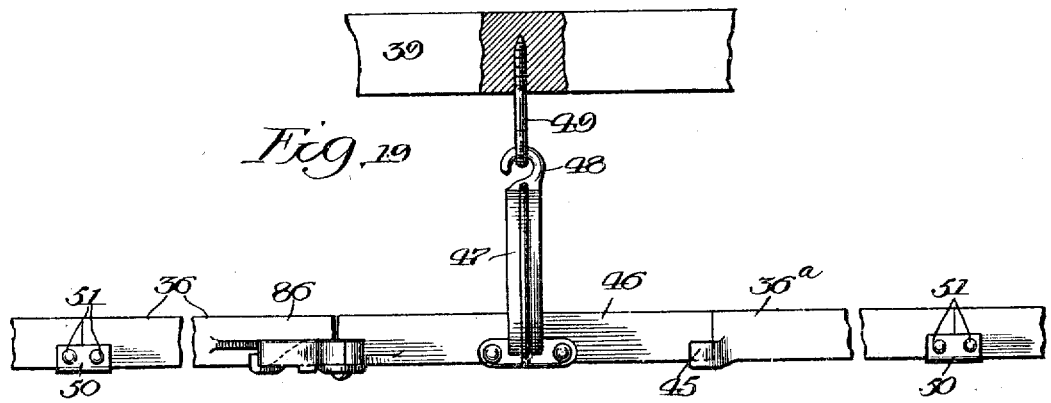
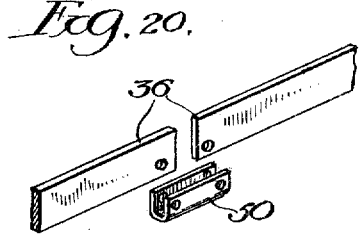

J. C. FITZGERALD.
ELEVATED TRACK FOR CARRIERS.
APPLICATION FILED JUNE 17, 1909.
954,275.
Patented Apr. 5, 1910.
6 SHEETS—SHEET 6.
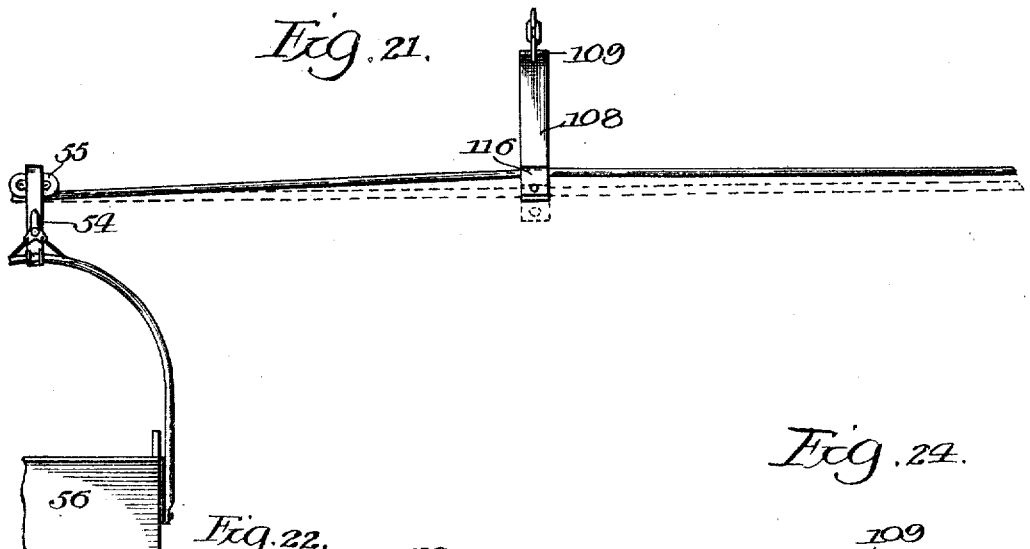
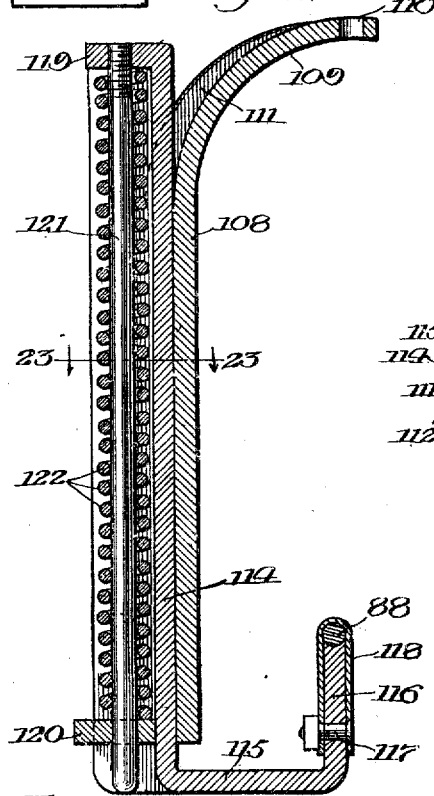
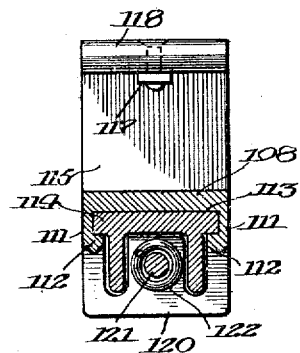
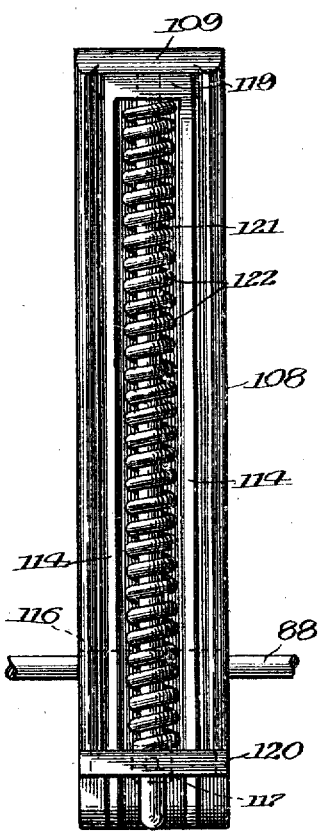
Witnesses
Inventor
Jeremiah C. Fitzgerald
by Chas. C. Tillman Atty

UNITED STATES PATENT OFFICE.

JEREMIAH C. FITZGERALD, OF DE KALB, ILLINOIS, ASSIGNOR TO SMITH MANUFACTURING COMPANY, OF CHICAGO, ILLINOIS, A CORPORATION OF ILLINOIS.

ELEVATED TRACK FOR CARRIERS. REISSUED 954,275. Specification of Letters Patent. Patented Apr. 5, 1910.

Application filed June 17, 1909. Serial No. 502,673.

*To all whom it may concern:*

Be it known that I, JEREMIAH C. FITZGERALD, a citizen of the United States, residing at De Kalb, in the county of Dekalb, State of Illinois, have invented certain new and useful Improvements in Elevated Tracks for Carriers, of which the following is a specification.

This invention relates to improvements in elevated tracks of the type designed for the travel of wheeled or roller carriers equipped with and supporting cars or receptacles, for the material to be transferred from one place to another, and while it is more particularly intended for use on farms and about the barns thereof, and for carrying manure from the stalls out of the barn to suitable points, yet it is applicable for the travel of carriers used for other purposes, such as for carrying grain, silage and other kinds of feed to the stalls, or for carrying other articles for other purposes, and it consists in certain peculiarities of the construction, novel arrangement, and operation of the various parts thereof, as will be hereinafter more fully set forth and specifically claimed.

The principal object of the invention is to provide an elevated track for carriers, of the above named general character which shall be simple and inexpensive in construction, strong, durable and efficient in operation, easily installed without the employment of a skilled mechanic, and so made that its parts may be rigidly or yieldingly supported, usually from a support above the track, and in such a manner as to offer no obstruction to the wheels or rollers of the carrier as they travel on and along the track, as well as to provide branch tracks, to any one of which the cars or carriers may be transferred from the main track, by means of a suitable switch, and in such a manner that the carrier, when on one of the branch tracks, will be prevented in its return movement, from running off said track should the switch be improperly located.

A further object of the invention is to provide simple and efficient means for connecting a flexible track such as a rod or cable, to a stiff or rigid track, such as a bar or rail, in such a manner that the splice or connecting means will offer no obstruction to the passage of the wheels or rollers of the carrier.

Another object is to provide self-adjusting means for connecting parts of the track so that one section thereof may be extended at different angles from another section thereof.

Still another object is to provide a switch for transferring the carrier from the main track to the branch tracks, or vice versa, which switch shall be so constructed that it may be carried in stock, and shipped with its parts ready for operation, and adapted to be secured to a suitable support in any desired manner.

Numerous other objects and advantages of the invention will be disclosed in the subjoined description and explanation.

In order to enable others skilled in the art to which the invention pertains to make and use the same, I will now proceed to describe it referring to the accompanying drawings, in which—

Figure 14:
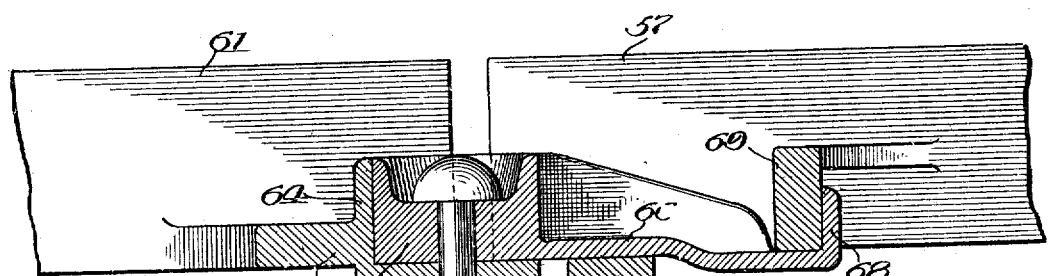
Figure 15:
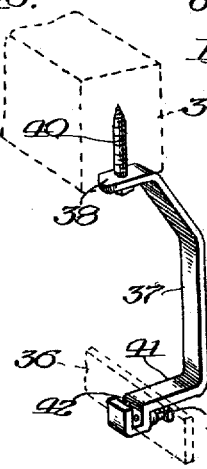
Figure 25:
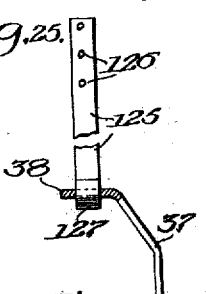
Figure 26:
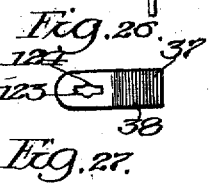
Figure 27:
Figure 16:
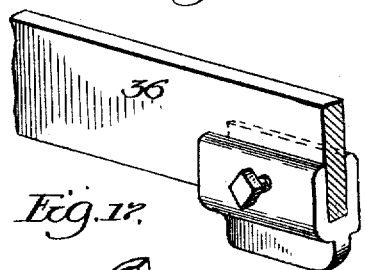
Figure 17:
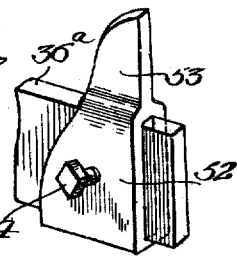

Figure 1 is a plan view of a barn, showing an elevated track for carriers embodying the invention with its parts arranged near the open ends of the stalls, so that manure may be taken therefrom and placed in the carrier which travels on the track, to the end that, the loaded carrier may be caused to pass out of the barn to any suitable point while traveling on the track, where it may be unloaded, or the reverse operation may be performed when it is desired to convey feed into the barn, to be distributed to the different stalls. Fig. 2 is a detached plan view of one form of a self-adjusting curve member, used for giving and maintaining to one section of the track, a suitable angle with respect to another section thereof. Fig. 3 is a cross-sectional view taken on line 2, 2 of Fig. 2 looking in the direction indicated by the arrows, and illustrating a modification in the construction of the piece of flexible track which it supports. Fig. 4 is a view in side elevation of a portion of the branch tracks, a part of the main track, and the switch mechanism which unites the same, showing said parts mounted by suitable hangers on a support. Fig. 5 is a cross-sectional view taken on line 5, 5 of Fig. 4 looking in the direction indicated by the arrows, and showing the means for operating the combined switch hanger and safety stop for the carrier. Fig. 6 is a plan sectional view taken on line 6, 6 of Fig. 4 looking in the direction indicated by the arrows. Fig. 7 is a detached perspective view of the keeper for the combined hanger and safety stop. Fig. 8 is a similar view of a portion of one of the branch track rails showing the end thereof adjacent to the switch member. Fig. 9 is a perspective view of a portion of an overhead support, showing a part of the stiff or rigid track supported thereon, and illustrating one way of connecting the flexible track to the rigid one, as well as one means for securing the flexible track to said support. Fig. 10 is a perspective view of a portion of the stiff or rigid track rail shown in Fig. 9, illustrating one splicing or connecting means for uniting it to the flexible track. Fig. 11 is a detached perspective view of the combined switch hanger and safety stop for the carrier. Fig. 12 is a plan view of a modified form of the self-adjusting curve member. Fig. 13 is a similar view of the hinge used for uniting two members of the track. Fig. 14 is a view partly in section and partly in elevation, taken on line 14, 14 of Fig. 13 looking in the direction indicated by the arrows. Fig. 15 is a perspective view of one of the rigid track hangers used for supporting the stiff track rails. Fig. 16 is a perspective view of a portion of one of the track rails showing a trip secured thereto. Fig. 17 is a like view of a portion of one of the track rails showing a stop for the carrier secured thereto. Fig. 18 is a view partly in section and partly in elevation of a portion of a barn, showing the track extending thereinto and illustrating means for detachably uniting members of the track, so that the sliding door of the barn may be closed. Fig. 19 is an enlarged view in elevation of a portion of the track shown in Fig. 18, illustrating the manner of securing the detachable member in position. Fig. 20 is a detached perspective view of two pieces of the rigid track and a clip used for securing them together. Fig. 21 is a view in side elevation of a portion of the flexible part of the track, showing one of the self-adjusting hangers supporting the same. Fig. 22 is an enlarged vertical central sectional view of said hanger. Fig. 23 is a plan sectional view taken on line 23, 23 of Fig. 22 looking in the direction indicated by the arrows. Fig. 24 is a view in side elevation of the self-adjusting hanger looking in the direction opposite from that shown in Fig. 21. Fig. 25, is a side view of a portion of a modification in the construction of a hanger for the rigid track. Fig. 26, is a plan view of the upper portion thereof, and Fig. 27, is an edge view of a portion of the strap for said hanger.

Like numerals of reference refer to corresponding parts throughout the different views of the drawings.

The reference numeral 30, designates a barn, which may be of the ordinary or any preferred construction, but in the present instance is shown as being rectangular in shape and provided in one of its ends with a doorway 31, and in one of its sides near its other end, with another doorway 32, each of which may be closed by means of doors 33, which may be of the ordinary or any preferred kind.

As shown in Fig. 1 of the drawings, the barn may have suitably arranged therein a number of stalls 34 some of the groups 35, of which, are located longitudinally with respect to the barn, and others transversely with respect thereto, but the arrangement of the groups of stalls may be varied as is apparent.

Extended through one of the doorways of the barn, and usually the doorway 32 thereof, is a track section 36 of stiff rails or bars, which is supported within the barn by means of a series of hangers 37, each of which consists of a metal bar having at its upper end a horizontally disposed and apertured portion 38, to rest against the lower surface of the supports 39 for the hangers and tracks, which supports may be joists located at a suitable elevation in the barn or elsewhere. The portion 38 of each of the hangers is secured to the joist 39 or other support, by means of a screw bolt or spike 40 extended through the opening in the portion 38 and into the joist or support. The lower end of each of the hangers 37 is also provided with a horizontally disposed portion 41 which has near its free end an upwardly opening groove or channel 42, of sufficient size to provide a snug fit for the rail section 36, which is located horizontally therein and may be firmly held in such position by means of a set screw 43, seated in one side of the channel 42, all of which will be clearly seen by reference to Fig. 15 of the drawings.

Referring now to Figs. 1, and 18, it will be seen that the track section 36, is so located in an elevated position as to be near the open ends of the stalls 34, of the group thereof at one end of the barn, which for convenience of explanation will be termed the rear end, and near the open ends of the stalls in the group, near one side of the barn and then in front of said side group to about the middle of the barn, where it terminates at some distance inwardly from the doorway 31 in the front of the building. Mounted on a horizontally disposed support 39ª, on the outside of the barn 30, and preferably in alinement with the track section 36, is another track section 36ª, of stiff rails or bars, which are likewise suspended from the support 39ª for the track section 36ª, which may be held at its elevated position by means of uprights 44, or otherwise. In order to permit the door 33, to be closed the adjacent ends of the track sections 36, and 36ª, are spaced apart, that is to say, the track section 36, terminates within the barn, a short distance from the side wall thereof in which the doorway 32, is formed while the track section 36ª, terminates at its inner end a short distance from the outside of the barn, and has on the lower portion of said end a channeled extension 45, see Fig. 19, to receive the outer end of a gate 46, which is detachably connected at its other end and hinged for lateral movement to the outer end of the track section 36, by means of a hinge mechanism similar to that used for connecting the switch member for the branch tracks to another track section, as will be presently explained. The gate 46 has secured to one of its sides at about its middle an upright hanger 47, the upper end of which is provided with a hook 48, to engage the ring of a screw-eye 49, secured to the joist or support 39, near the doorway 32, of the barn. The meeting ends of the stiff rails or bars of the track sections of the rigid track may be secured together by means of U-shaped clips 50, and bolts or rivets 51, which are passed through openings in the sides of said clips, and in the lower portion of the rails, as will be clearly understood by reference to Figs. 19 and 20 of the drawings. The outer end or terminal of the rigid track section may be provided with a stop to prevent the carrier running off the track at said end, which stop (see Fig. 17) consists of a vertically elongated sleeve 52, of a size and shape to fit around the rail or bar, and has at its top an upward extension 53, which is preferably rounded on its edge presented toward the carrier. This stop may be located at any suitable point on the rail of the track and there firmly held by means of a set screw 54 seated in one of the sides of the sleeve and adapted to engage with its inner end one side of the rail or bar.

In Figs. 4 to 8 inclusive, is shown in detail, the construction of a switch mechanism, to be used when it is desired to switch the carrier from one track to another, when a plurality of branch tracks are employed, as is shown in Figs. 1 and 6 of the drawings, and to prevent the carrier running off the tracks at the switch, should the latter be misplaced. In this switch mechanism 52, represents a rigid track section, which is suspended from a board or other suitable support 53, by means of hangers 37ª, which are secured at their lower ends to the lower portion of the rails of the track section 52, and on that side thereof opposite that on which the pendent bracket 54, of the carrier 55, passes, which bracket carries a car or receptacle 56 for the materials to be transferred. The board or support 53, may be of any suitable size, form and material but preferably of wood and of sufficient size and length to support a short rail 57, of the track section 52, as well as short rail sections 58, 59, 60, and the switch member 61, which carries the combination hanger and safety stop for the carrier. Each of the short rail sections 58, 59 and 60, is suspended from the lower surface of the board or support 53, by means of a bracket 37ª, which brackets are also secured at their lower ends on the sides of said rail sections opposite from that on which the pendent bracket 54, of the carrier will pass. In the drawings the short rail sections 58, 59, and 60, are shown as being connected by means of clips 50, to track sections 36, 36ᵇ, 36ᶜ, respectively which two latter track sections, are shown in Fig. 1, as being branch tracks, and disposed at the open ends of certain of the stalls 34, within the barn, but it will be understood that when the switch mechanism consisting of the short rail sections 57, 58, 59, 60, and the switch member 61, carrying the combined hanger and safety stop is to be shipped, said parts only, are secured to the board or support 53, and the rail sections 36, 36ᵇ, 36ᶜ, as well as their clips 50, are omitted, and it will also be understood that the clips 50, which unite the short rail section 57, to the adjacent rail of the section 52, as well as, said rail, will be omitted, but the keeper for the combined hanger and the pulleys for operating the switch member will be attached to said board or support, so that the said parts may be shipped in their operative positions. Each of the short rail sections 58, 59, and 60, is provided at its end adjacent to the switch member 61, and on its lower portion with a channeled extension 62, to receive the adjacent end of the switch member 61, which is provided at its other end with a laterally disposed lug or projection 63, having a segmental socket 64, in its upper portion to receive and furnish a bearing for the circular end portion 65, of an arm 66, which is pivotally connected to the lug 63, by means of a pivot 67, extending through suitable openings in said lug and the circular portion 65, of the arm. As is clearly shown in Figs. 13 and 14, the arm 66, is provided at its end opposite the circular portion 65, with an upward hook or extension 68, to engage a laterally disposed lug 69, on the short rail section 57, and near the end thereof adjacent to the switch member 61, which lug is connected to another laterally disposed lug 70, on the section 57, near the said end thereof, by means of a longitudinally disposed portion 71, located at the outer ends of said lugs, thus leaving an opening through which the hooked portion 68, of the arm 66, may be passed. By this arrangement, it will be seen and understood that a detachable hinge for uniting the switch member 61, and rail section 57, is provided which will permit of the lateral as well as vertical movement of the switch member, but will prevent the latter dropping down any farther than on a level with the track. It is evident that, by the use of the hinge, the switch member can be attached to or removed from the rail 57, without the employment of bolts, rivets or screws.

Transversally secured on the switch member 61, and near its end adjacent to the short rail sections 58, 59, and 60, is a combination hanger and safety stop for the carrier which consists of an upright portion 72, having at its lower end a horizontally disposed portion 73, provided with a recess 74, to receive a portion of the member 61 to which the portion 73, is secured by means of bolts or rivets passed through said openings, as well as, openings in the member 61, and having at its upper portion a horizontally disposed arm 75 provided with a down turned portion 76, or goose neck, having on its outer portion a lateral projection 77, to act as a stop for the carrier, as will be presently explained. The upright portion 72, of this hanger is provided with a horizontally disposed arm 78, which is extended in the opposite direction from the arm or extension 77, and is used for a like purpose. The arm 75, is provided on its upper portion with a hook 79, and on each side of said hook with an opening 80, for the passage of cords or cables, used to operate the combined hanger and switch member. Secured to the lower surface of the board or support 53, and transversely thereof at a point near the upper end of the combined hanger, is a keeper 81, which has on its portion adjacent to the arm 75, of the combined hanger, a segmental flange 82, which is provided with a series of recesses 83, to receive the hook 79, on the combined hanger arm. The recesses 83, in the flange 82, of the keeper, correspond in number with the number of tracks to which the switch member 61, may be thrown, and are so spaced that when the hook 79, rests in one of said recesses, the switch member 61, will engage with its free end one of the channeled projections 62, of the short rail sections of the branch tracks.
Journaled on the board or support 53, on each side of the switch member 61 is a pulley 84, over which pass cables 85, which depend on each side of the switch member and are connected to the arm 75, of the combined hanger, preferably by being passed through the openings 80 in said arm. By pulling down on the cables 85, it is apparent that the combined hanger will be raised so that the hook 79, thereon will be lifted out of one of the recesses 83, when by pulling on one of the cables the hook 79, may be slid along the flange 82 of the keeper, till it reaches the recess opposite the rail to which it is desired to connect the switch member where said hook may be allowed to rest. In this operation it is apparent that as the switch member 61, is secured to the combined hanger 72, and has one of its ends hinged as before explained to the short rail section 57, it will be moved upwardly a sufficient distance to allow its free end to be disengaged from the channeled projection 62, and laterally to the desired position.

The gate 46, illustrated in Fig. 19, of the drawings, and above referred to and the rail 86 adjacent thereto, of the track section 36, are equipped with hinged members of the same construction as shown in Figs. 13 and 14 and just above described, that is to say, the gate member 46 corresponds with the switch member 61, in its construction, while the rail 86 corresponds in its construction with the track section 57 of the switch mechanism.

The invention comprises the combination with a rigid or stiff track section of a flexible track, such as a cable 87, or a flexible rod 88, see Figs. 1, 3 and 9 of the drawings, and it is often desirable that the flexible track section may be located at different angles with respect to the stiff or rigid section to which it is connected, and in Figs. 1, 2, 9, 10 and 12, I have shown means for connecting the flexible track section to a rigid track section, and to permit the flexible track to be placed and maintained at any suitable angle to the rigid track. The connection consists of the rigid bar or rail 52, provided at its end adjacent to the flexible track with an overhanging portion 90, which forms a groove or channel 91, of sufficient size to receive the cable or rod of the flexible track, but it may be clamped thereon by any suitable means. The overhanging portion 90 of this connection is tapered toward its free end as at 92, see Fig. 10, so as to permit the wheels or rollers of the carrier to pass thereover without material obstruction. The end of the rod or cable of the flexible track, adjacent to the rigid bar or rail 52, may be fastened to a hook 93, on a bolt 94, secured to a portion 95, of the overhead support 39, which as before stated may be joists or other suitable support. The rigid bar or rail 52, may be suspended from the support 39, by means of one or more hangers 37, or otherwise. To enable the flexible track section to be placed at different angles to the rigid track section, a self-adjusting curve member is employed, which as shown in Figs. 1, 2 and 3 of the drawing consists of a plurality, usually two, segmental members 96 and 97 which have at their adjacent ends lateral projections 98 and 99, respectively, which projections are pivotally connected together by means of a pivot in suitable openings therein. The projection 98, has near its free end an opening 101 for the reception of one end of a guy-rod or chain 102, which may be connected at its other end to a post or support 103, at any desired point along or near the flexible track section. Each of the members 96 and 97, is provided at its upper part with an overhanging portion 104, see Fig. 3, which may be clamped on the rod 88, or cable 87 of the flexible track. Secured in a suitable opening in one of the segmental members of the adjustable curve member, is a screw 105, the head of which is adapted to rest on the inner end of the other segmental member so as to restrict the movement of said members, for it is apparent that by tightening up the screw 105, the adjacent ends of the members 96 and 97, may be brought nearer together, thus causing them to form a smaller curve and permitting the flexible track to be located at a more acute angle to the rigid or other track, than if said segmental members were held farther apart at their adjacent ends by means of the screw 105, which may be done by unscrewing said screw.

Instead of using a curve member of the construction shown in Figs. 1, 2 and 3 and just above described, a curve member of the construction shown in Fig. 12, may be employed, which consists of two segmental members, 96ª, and 97ª, which are pivotally connected near their inner ends to the arms of a yoke or bow 106, which may be attached by means of a guy-rod or chain 102, to a post or other suitable support at a suitable point along the flexible track. In other respects the curve member shown in Fig. 12, is constructed similarly to that shown in Figs. 2 and 3 of the drawings.

As the flexible track whether formed of a cable or rod, when supported at its outer end by a post 107, or otherwise, is liable to sag, by reason of the weight of the carrier 55, as it passes thereover, and rigid supporting hangers for said track serve to hold it immovably at the points thereof at which said hangers are connected, and will allow the track to sag between said hangers, thus necessitating the carrier in its travel on the track, to pass up and down inclined portions thereof, it has been found desirable to employ self-adjusting hangers for the flexible track, to overcome this objection, the construction and application of one of which is illustrated in Figs. 21 to 24 inclusive of the drawings. This self-adjusting hanger consists of an upright front or upper member 108, which has at its upper portion a deflected part or arm 109, provided with an opening 110, for the reception of a screw or other device to be used for securing said member to an overhead support. As shown in Figs. 22 and 23 the member 108, is provided on its rear surface at each edge thereof, with a rearwardly extended flange 111, each of which is inturned as at 112, at its outer edge, thus forming a guideway 113, for the rear or lower upright member 114, which is adapted to fit and move in said guideway. The rear or lower member 114, has at its lower end a forwardly projecting portion 115, which is provided with an upward extension 116, having an opening for a bolt or rivet 117, used for securing a clip 118, on said upright portion and over the rod 88, or cable when the latter is used, which rod or cable will be held on the upper portion of the extension 116, by means of the clip 118, as is apparent. The member 114, is provided at its upper end with a rearward extension 119, and the member 108, is provided at its lower end with a rearward extension 120, which latter extension as well as the one 119, is provided with an opening to receive a rod 121, around which is coiled a spring 122, which rests at its ends against the said extensions. By this construction and arrangement of the parts of the self-adjusting hanger it is apparent that as the carrier 55, approaches the hanger, the member 114, will be depressed by reason of the weight of the carrier, so as to permit the flexible track to sag or move downwardly to about the position shown by dotted lines in Fig. 21, of the drawings. After the carrier has passed the hanger, it is evident that the spring 122, will retract the lower or rear member 114, and raise the flexible track to its normal position, in which operation it is evident that as the meeting surfaces of the members 108, and 114, are flat and smooth, and that as said members contact with one another throughout almost their entire lengths the strain will be uniformly distributed.

By reference to Figs. 9 and 10, of the drawings, it will be seen that the bar 52, is provided with a bend 92ª, near its overhanging part 90, which will cause the main portion of the rail 52, to be located far enough from the post 90ª, to prevent its interference with the passage of the parts of the carrier, the pendent bracket 54, of which, it will be understood, will pass on the side of the rail or track 52, opposite that adjacent to said post.

Referring again to Figs. 4, 5 and 6, of the drawings, it will be understood that when the switch member 61, and combination hanger 72, occupy the positions shown in Fig. 5, the arm or extension 77, and gooseneck 76, of the said hanger will be located so as to prevent the carrier running off the track 58, and that the portion 72, will prevent the carrier running off the track 60, should said carrier be located on either of said tracks when the switch member 61, is thrown to the middle or track section 59, as shown. When the combination hanger is moved so as to place the switch member 61, in the channeled end 62, of the track section 58, it is apparent that the arm 78, will afford a stop for the carrier near the ends of the track sections 59, and 60, and that when the combination hanger is moved so that the switch member 61, will lie in the channel 62, of the track section 60, the arm 77, will afford a stop near the ends of the track sections 58, and 59, so as to prevent the carrier from passing off said sections.

In Figs. 25, 26, and 27, is shown a modification in the construction of a hanger for a rigid track section, which is of a similar construction to that shown in Fig. 15, and above described, except that the deflected part 38, at the upper end of the upright portion 37, is provided with an elongated opening 123, having between its ends enlargements 124, thus providing an opening which is adapted for a screw or spike 40, to engage the support 39, or for a metal strap 125, which is provided with holes 126, for nails used for securing it to the side of the support at a suitable height thereon. The lower end of the strap or piece 125, is looped back upon itself as at 127, thus forming an enlargement to fit in the opening 123, and to hold the hanger in place thereon without the use of rivets or screws. It will be understood that the lower end of the hanger is provided with an extension 41, channel or recess 42, and set-screw 43, like those of the hanger shown in Fig. 15, of the drawings.

By employing the construction shown in Fig. 9, of the drawings, means is afforded for the passage or travel of a single carrier from one of the track sections to the other, that is to say, it is not necessary for the carrier to have two sets of wheels, one set to travel on one of the track sections, and the other set to travel on the other track section when the carrier reaches the same as is ordinarily the custom. This construction also affords a very strong, simple and efficient support or brace for that portion of the flexible track between the over-hanging part 90, of the rigid section 52, and the end of the flexible section adjacent thereto, besides the flexible track section will thereby be supported on a level with the rigid track section.

Having thus fully described my invention, what I claim as new, and desire to secure by Letters-Patent, is—

1. In an elevated track for carriers, the combination with a suitably supported rigid track section, of a flexible track section, and deflecting means continuously uniting said sections.

2. In an elevated track for carriers, the combination with a rigid track section, of a suitably supported flexible track section operatively connected thereto, of a rigid and depending hanger for the rigid track section consisting of an upright piece having at its upper end a deflected portion adapted to be secured to a support and provided at its lower portion with a horizontal extension having a channel in its upper surface to receive the track rail, and a set-screw located in one of the side walls of said channel.

3. In an elevated track for carriers, the combination with a rigid track section, suitably supported from overhead and having near one of its ends a lateral bend and at said end an overhanging portion, of a flexible track section secured near one of its ends to a suitable support near the overhanging part of the rigid section and extended through said overhanging part and engaged thereby.

4. In an elevated track for carriers, the combination with a suitably supported rigid track section, of a flexible track section operatively connected thereto, and a self-adjusting hanger secured at its upper end to a support above the flexible track and engaging said track with its lower portion.

5. In an elevated track for carriers, the combination with a suitably supported rigid track section, of a flexible track section operatively connected thereto, a hanger consisting of a front member secured at its upper end to a support above the flexible track, and a spring-actuated rear member movably connected to the front member and having an extension at its lower part to engage the flexible track.

6. In an elevated track for carriers, the combination with a suitably supported rigid track section, of a flexible track section secured at its ends, engaging means at one end of the rigid track section to connect it to the flexible track section between its ends, and a brace engaging the flexible track section between one of its ends and its point of engagement with the rigid track section.

7. In an elevated track for carriers, the combination with a flexible track section, of a self-adjusting hanger consisting of a front member suitably secured at its upper end to a support above the track and having on its rear surface a guideway and at its lower end a rearward extension, a rear member longitudinally and movably located in the guideway of the front member and in contact therewith, said rear member having at its upper portion a rearward extension, a rod located in openings in the said extensions of the front and rear members, and a spring surrounding said rod and resting at its ends against said extensions.

8. A self-adjusting hanger for a flexible track section, consisting of a front member having means to suitably secure it at its upper end to a support above the track, and having on its rear surface a guideway and at its lower end an apertured rearward extension, a rear member longitudinally and movably located in the guideway and opening of the extension of the front member and in contact with said member, said rear member having at its upper portion, a rearward extension, a rod located in openings in the said extensions of the front and rear members, and a spring surrounding said rod and resting at its ends against said extensions.

9. In an elevated track for carriers, the combination with a suitably supported rigid track section having near one of its ends a lateral bend and at said end a laterally disposed channeled portion, of a suitably supported flexible track section engaged by said channeled portion.

10. In an elevated track for carriers, the combination with a rigid track section, of a hanger therefor, consisting of an upright piece having at its upper end a deflected portion provided with an elongated opening having enlargements between its ends, a supporting device located in said opening and having an enlargement at its lower end and provided at its upper portion with means to adjustably secure it to a support, the said upright piece provided at its lower portion with a horizontal extension having a channel in its upper surface to receive the track rail, and a set-screw located in one of the side walls of said channel.

11. In an elevated track for carriers, the combination of a suitably supported flexible track section, of a self-adjusting curve member consisting of a plurality of segmental members pivotally connected together and each having an overhanging portion engaging the flexible track, and means to support the complete curve member at one side of said track.

12. In an elevated track for carriers, the combination with a suitably supported flexible track section, of a self-adjusting curve member consisting of a plurality of segmental members pivotally connected together and each having an overhanging portion engaging the track, a set-screw located between the adjacent ends of two of the segmental members to restrict their inward movements, and means to support the complete curve member at one side of the said track.

13. In an elevated track for carriers, the combination with a suitably supported rigid track rail, of a plurality of short and rigid track sections suitably supported at a distance from one end of said rail and having their ends adjacent to said rail converging, the said rail having on one of its sides laterally disposed and spaced apart lugs connected together at their outer ends, a switch member having at one of its ends and on one side thereof a lateral extension provided with an apertured socket, an arm having on one of its ends an apertured rounded portion to fit in said socket and at its other end an upturned projection to engage one of the lugs on the said rail, a pivot located in the openings of the said arm and socket, and means to raise the switch member and to shift it from one of the short rail sections to the other.

14. In an elevated track for carriers, the combination with a suitably supported rigid track rail, of a plurality of short and rigid track sections suitably supported at a distance from one end of said rail and having their ends adjacent to said rail converging, a switch member hinged for vertical and lateral movement at one of its ends to one end of said rail and extended at its other end to one of said short track sections, an upright having an off-set portion at its lower part secured to the switch member and provided with one or more laterally disposed arms, and means for slidably connecting the upper portion of the upright to a support.

15. In an elevated track for carriers, the combination with a suitably supported rigid track rail, of a plurality of short and rigid track sections suitably supported at a distance from one end of said rail and each provided at its end adjacent to said rail with a channeled portion, a switch member hinged at one of its ends to one end of said rail and its other end adapted to rest in one of the channels of the short track sections, an upright having an off-set portion at its lower part secured to the switch member and provided with one or more laterally disposed arms, and means for slidably connecting the upper portion of the upright to a support.

16. In an elevated track for carriers, the combination with a suitably supported rigid track rail, of a plurality of rigid track sections suitably supported at a distance from one end of said rail and each provided at its end adjacent to said rail with a channeled portion, a switch member hinged at one of its ends to one end of said rail and its other end adapted to rest in one of the channels of the track sections, an upright having an off-set portion at its lower part secured to the switch member and provided with one or more laterally disposed arms, and means for slidably connecting the upper portion of the upright to a support.

17. In an elevated track for carriers, the combination with a suitably supported rigid track rail, of a plurality of rigid track sections suitably supported at a distance from one end of said rail and having their ends adjacent to said rail converging and each provided with a channeled portion, a switch member hinged for vertical and lateral movement at one of its ends to one end of said rail and extended at its other end to rest in one of the channels of the track sections, an upright having an off-set portion at its lower part secured to the switch member and provided with one or more laterally disposed arms, and means for slidably connecting the upper portion of the upright to a support, a pulley journaled on each side and above the switch member, and a cable extended over said pulley and connected to the upright for the purpose of raising and shifting the switch member from one of the track sections to another.

18. In an elevated track for carriers, the combination with a suitable overhead support, of a rigid track rail suspended below the same, a plurality of rigid track sections suspended below said support at a distance from one end of said rail and having their ends adjacent to said rail converging and each provided with a channeled portion, a switch member hinged for vertical and lateral movement at one of its ends to one end of said rail and extended at its other end to rest in one of the channels of the track sections, a keeper secured to the lower surface of said support transversally of and near one end of the switch member, said keeper having on one of its sides a segmental flange provided with a series of recesses, a combined hanger and safety stop consisting of an upright portion having at its lower end a laterally disposed projection secured to the switch member and having at its upper portion a horizontal extension transversally disposed above the switch member and provided with a goose-neck having an outwardly extended arm, a hook on the upper portion of said extension, and a laterally and outwardly disposed arm on said upright portion, a pulley journaled on said support on each side of the switch member, and a cable extended over said pulleys and connected to the transverse extension of the hanger for the purpose of raising and shifting the position of the same.

19. In an elevated track for carriers, the combination with a suitable overhead support, of a rigid track rail suspended below the same, a plurality of rigid track sections suspended from said support at a distance from one end of said rail and having their ends adjacent to said rail provided with a channeled portion, the said rail having on one of its sides laterally disposed and spaced apart lugs connected together at their outer ends, a switch member having at one of its ends and on one side thereof a lateral extension provided with an apertured socket, an arm having on one of its ends an apertured rounded portion to fit in said socket and at its other end an upturned projection to engage one of the lugs on the said rail, a pivot located in the openings of the said arm and socket, a keeper horizontally and transversally supported above and near one end of the switch member, said keeper having on one of its sides a flange provided with a series of recesses, a combined hanger and safety stop consisting of an upright portion having at its lower end a laterally disposed projection secured to the switch member and having at its upper portion a horizontal extension transversally disposed above the switch member and provided with a gooseneck having an outwardly extended arm, a hook on the upper portion of said extension to engage the flange of the keeper, and a laterally and outwardly disposed arm on said upright portion, a pulley journaled on each side of the switch member and above the same, and a cable extended over said pulleys and connected to the transverse extension of the hanger for the purpose of raising and shifting the position of the same.

JEREMIAH C. FITZGERALD.

Witnesses:
Geo. W. Rowe,
Ashley C. Smith.